US011216842B2

(12) United States Patent
Arnold et al.

(10) Patent No.: US 11,216,842 B2
(45) Date of Patent: Jan. 4, 2022

(54) MARKETING OFFERS

(71) Applicant: Optical Phusion, Inc., Littleton, MA (US)

(72) Inventors: Prescott Arnold, Concord, MA (US); William Scarsciotti, Franklin, MA (US)

(73) Assignee: Optical Phusion, Inc., Littleton, MA (US)

( * ) Notice: Subject to any disclaimer, the term of this patent is extended or adjusted under 35 U.S.C. 154(b) by 0 days.

(21) Appl. No.: 14/023,716

(22) Filed: Sep. 11, 2013

(65) Prior Publication Data

US 2015/0073901 A1  Mar. 12, 2015

(51) Int. Cl.
*G06Q 30/02* (2012.01)
*H04M 15/00* (2006.01)
*H04W 4/24* (2018.01)

(52) U.S. Cl.
CPC ..... *G06Q 30/0255* (2013.01); *G06Q 30/0226* (2013.01); *G06Q 30/0267* (2013.01); *G06Q 30/0269* (2013.01); *H04M 15/68* (2013.01); *H04M 15/8083* (2013.01); *H04M 15/83* (2013.01); *H04M 15/84* (2013.01); *H04M 15/842* (2013.01); *H04M 15/844* (2013.01); *H04M 15/846* (2013.01); *H04M 15/85* (2013.01); *H04M 15/851* (2013.01); *H04W 4/24* (2013.01)

(58) Field of Classification Search
CPC ........... G06Q 30/0255; G06Q 30/0267; G06Q 30/0226; G06Q 30/0269; H04M 15/846; H04M 15/844; H04M 15/85; H04M 15/851; H04M 15/83; H04M 15/8083; H04M 15/84; H04M 15/68; H04M 15/842; H04W 4/24
See application file for complete search history.

(56) References Cited

U.S. PATENT DOCUMENTS

| 8,489,112 | B2 | 7/2013 | Roeding et al. |
| 8,526,884 | B1* | 9/2013 | Price ..................... H04W 8/005 455/41.2 |
| 9,442,709 | B1* | 9/2016 | Delker ....................... G06F 8/61 |
| 2006/0085260 | A1* | 4/2006 | Yamagishi ....................... 705/14 |
| 2006/0163349 | A1* | 7/2006 | Neugebauer ........... G06Q 30/02 235/383 |
| 2007/0190995 | A1 | 8/2007 | Feiyun et al. |
| 2008/0059297 | A1* | 3/2008 | Vallier ................... G06Q 30/02 705/14.27 |

(Continued)

FOREIGN PATENT DOCUMENTS

| WO | WO 2005/017794 | 2/2005 |
| WO | WO 2013/114104 | 8/2013 |

OTHER PUBLICATIONS

Automatically Definition; https://www.google.com/search?q=define+automatically&rlz=1C1GCEB_enUS775US775&oq=defin&aqs=chrome.0.69i59l3j69i57j0j69i60j69i6l12.2127j0j1&sourceid=chrome&ie=UTF-8.*

(Continued)

*Primary Examiner* — Sam Refai
*Assistant Examiner* — Kyle G Robinson
(74) *Attorney, Agent, or Firm* — Fish & Richardson P.C.

(57) ABSTRACT

A method includes determining that a token associated with a customer is present in a store; and sending, to a mobile device associated with the customer, a signal to prepare the mobile device to be able to receive a marketing offer.

24 Claims, 9 Drawing Sheets

(56) References Cited

U.S. PATENT DOCUMENTS

Figure 1:
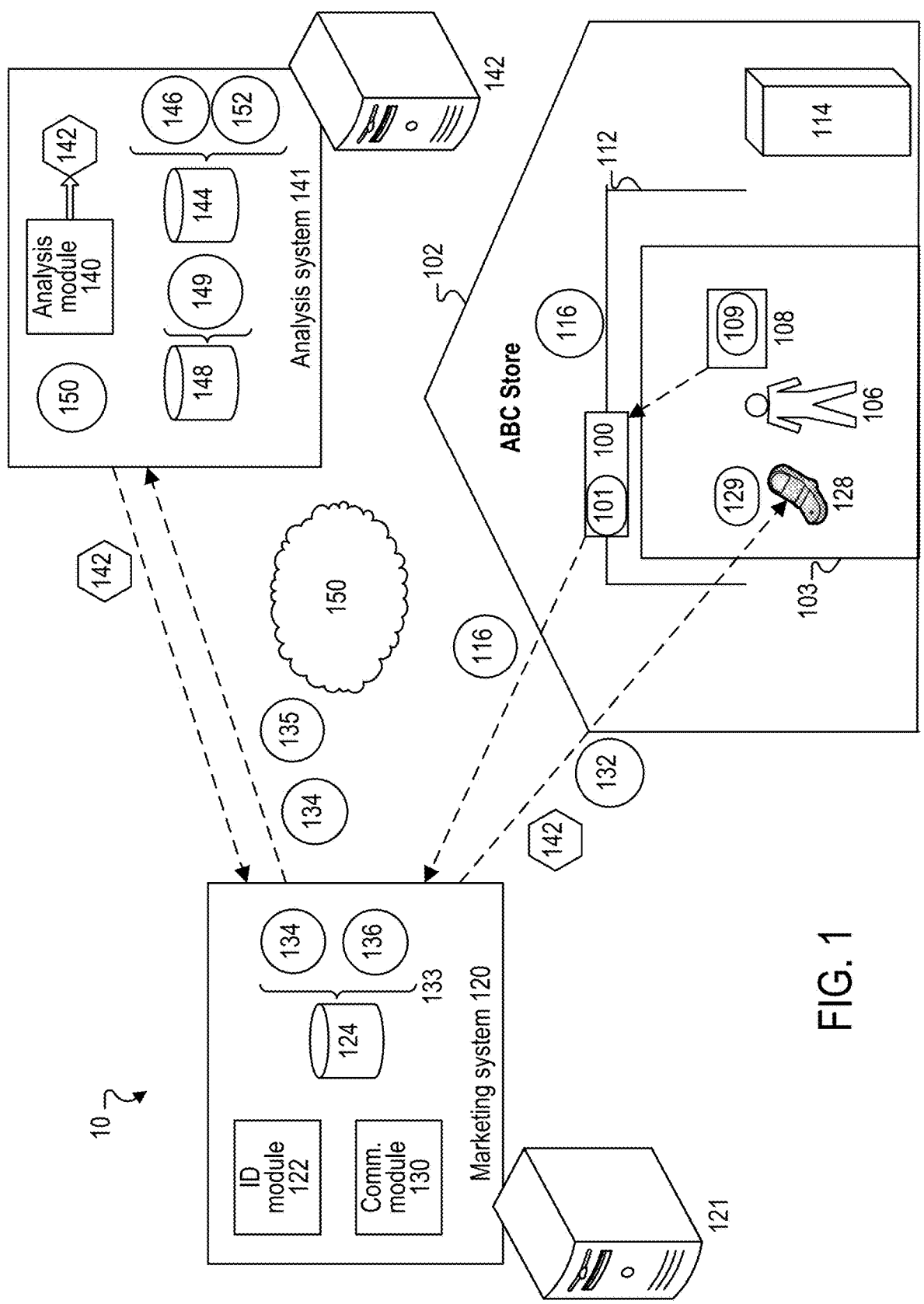

| | | | | |
|---|---|---|---|---|
| 2012/0122482 A1* | 5/2012 | Rajaniemi | ............... | H04W 4/50 |
| | | | | 455/456.1 |
| 2012/0316953 A1* | 12/2012 | Ramchandani | ...... | G06Q 20/341 |
| | | | | 705/14.39 |
| 2013/0073405 A1 | 3/2013 | Ariyibi | | |
| 2013/0217332 A1* | 8/2013 | Altman | .................. | H04H 60/90 |
| | | | | 455/41.2 |
| 2014/0161113 A1* | 6/2014 | Cui | ...................... | H04W 12/50 |
| | | | | 370/338 |

OTHER PUBLICATIONS

Swedberg, Claire, "Brouha Uses RFID to Measure Loyalty", RFID Journal, Nov. 7, 2011 (3 pages).

Sullivan, Laurie, "Loyal To RFID", InformationWeek, May 19, 2004 (1 page).

McBrearty, Rachael, "The Future of Retail Customer Loyalty RFID Enables Breakthrough Shopping Experiences", Cisco Internet Business Solutions Group (IBSG), White Paper, Jun. 2011 (9 pages).

Swedberg, Claire, "Can RFID Ensure the Safety of Medicine?", Washington State Rep Reintroduces RFID Legislation, RFID Journal, May 15, 2013 (2 pages).

Albrecht, Katherine, "RFID: Tracking everything, everywhere", Consumers Against Supermarket Privacy Invasion and Numbering (C.A.S.P.I.A.N), May 15, 2013 (3 pages).

The METRO "Future Store" Special report, "Scandal: The RFID Tag Hidden in METRO's Loyalty Card", RFID Nineteen Eighty-Four Spychips.com, May 15, 2013 (5 pages).

International Search Report and Written Opinion from PCT application No. PCT/US2014/054893 dated Jan. 29, 2015 (15 pages).

European Search Report from EP Application No. 14844344.3 dated Feb. 8, 2017 (6 pages).

European Communication Pursuant to Rule 70(2) and 70a(2) EPC issued in EP Application No. 14844344.3 dated Feb. 24, 2017 (1 page).

EP European Communication Pursuant to Article 94(3) EPC in EP Application No. 14844344.3, dated May 14, 2020, 8 pages.

Kuppusamy, "A Model for Remote Access and Protection of Smartphones Using Short Message Service", International Journal of Computer Science, Engineering and Information Technology, Feb. 2012, 2(1):95-104.

\* cited by examiner

MARKETING OFFERS

BACKGROUND

A retailer, for example, can administer a customer loyalty program to provide marketing offers, such as discounts, rebates, promotions, or other offers, to customers enrolled in the customer loyalty program. The marketing offers provided to each customer can be customized, e.g., based on the purchase history of the customer. Typically, marketing offers based on a customer loyalty program are provided when the customer leaves a store (e.g., checkout coupons provided with a register receipt) or when the customer is outside the store (e.g., newspaper or online advertisements of discounts available to members of the customer loyalty program).

SUMMARY

In a general aspect, a method includes determining that a token associated with a customer is present in a store; and sending, to a mobile device associated with the customer, a signal to prepare the mobile device to be able to receive a marketing offer.

Embodiments can include one or more of the following features.

Determining that the token is present in the store does not require an action by or awareness of the customer.

Determining that the token is present in the store includes detecting the presence of the token by radio frequency identification (RFID), global positioning service (GPS) detection, or both.

The method includes determining an identifier of the token, an identifier of the customer, or both. In some cases, the identifier of the token, the identifier of the customer, or both, includes an identifier associated with a loyalty program for the store. In some cases, the method includes identifying the mobile device associated with the customer based on the identifier of the token, the identifier of the customer, or both.

The method includes determining a location of the token in the store.

The signal to prepare the mobile device includes a signal to cause a wireless communications capability of the mobile device to be activated, a signal to cause a software application associated with the store to be activated, or both.

The signal to prepare the mobile device includes a signal to cause the mobile device to automatically prepare itself to receive the marketing offer.

The signal to prepare the mobile device includes a message instructing the customer to prepare the mobile device to receive the marketing offer.

The method includes sending the marketing offer to the mobile device.

The method includes sending, to a server, an identifier of the token, an identifier of the customer, or both.

The method includes receiving the marketing offer from a server. In some cases, the server identifies the marketing offer based on an identifier of the token, an identifier of the customer, or both.

The token includes a loyalty card.

In a general aspect, a system includes a detection device for detecting that a token associated with a customer is present in a store; and a communications device for sending, to a mobile device associated with the customer, a signal to prepare the mobile device to be able to receive a marketing offer.

Embodiments may include one or more of the following features.

The detection device can detect that the token is present in the store without requiring an action by or awareness of the customer.

The detection device includes an RFID reader.

The system includes multiple detection devices each positioned at a different location in the store. In some cases, the system includes a processing device for determining a location of the token in the store based on information from one or more of the detection devices.

The system includes a processing device for identifying the mobile device associated with the customer The signal to prepare the mobile device includes a signal to cause a wireless communications capability of the mobile device to be activated, a signal to cause a software application associated with the store to be activated, or both.

The communications device is for sending, to a server, an identifier of the token, an identifier of the customer, or both, and for receiving the marketing offer from the server.

In a general aspect, a computer readable medium stores instructions for causing a computing system to determine that a token associated with a customer is present in a store; and sending, to a mobile device associated with the customer, a signal to prepare the mobile device to be able to receive a marketing offer.

In a general aspect, a method includes, within 5 minutes after a customer has entered a store, sending to a server information that identifies the customer and confirms that a signal has been sent to a mobile device of the customer to prepare the mobile device to receive a marketing offer.

In a general aspect, a method includes, after a customer has entered a store, receiving information that identifies the customer and confirms that a signal has been sent to a mobile device of the customer to prepare the mobile device to receive a marketing offer, and before the customer has exited the store, sending a marketing offer to the mobile device of the customer, the marketing offer being one that could be accepted by the customer before the customer has exited the store.

In a general aspect, a method includes, when a customer of a retail store has entered the store, automatically determining the presence of the customer in the store by detecting a token of a loyalty program that is being carried by the customer, and sending an identifier of the token to a server for use in identifying a mobile device of the user and sending a signal to cause the mobile device to prepare to be able to receive a marketing offer that can be accepted by the customer before leaving the store.

In a general aspect, a method includes receiving from a reader an identifier of a token carried by a customer into a store, the token being associated with a loyalty program of which the customer is a participant, and, while the customer is in the store, (a) using the identifier of the token to retrieve data associated with the customer, (b) causing a mobile device carried by the customer to prepare itself to receive a communication, (c) generating a custom marketing offer for the customer based on the retrieved data, (d) associating an identifier of the mobile device with the customer, and (e) based on the identifier of the mobile device, sending the marketing offer to the prepared mobile device.

These and other aspects, features, and implementations, and combinations of them, can be expressed as methods, apparatus, systems, components, software products, business methods, means and steps for performing functions,

DESCRIPTION

Figure 2:
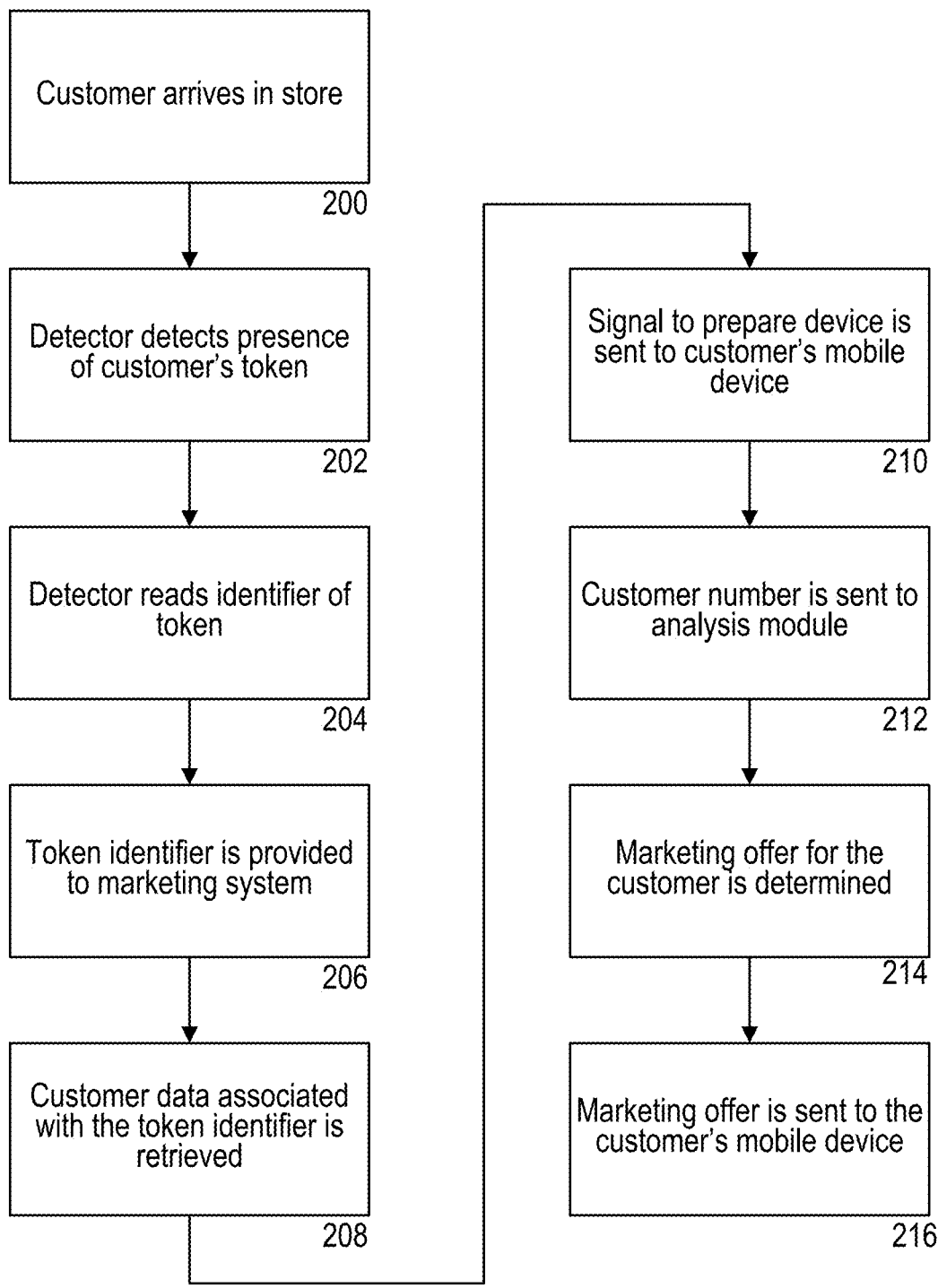

FIG. 1 is a diagram of a marketing system.
FIG. 2 is a flow chart.
FIGS. 3-8 are screenshots.
FIG. 9 is a diagram of a computing system.

Among other things, we describe here an approach to delivering customized marketing offers to a customer beginning, for example, when the customer arrives in the store and no later than when the customer pays for products or services in the store. For instance, the arrival of the customer in the store can be detected by detecting the presence of a token, such as loyalty card for a store or chain of stores, carried by the customer. The token can have a unique identifier, such as a serial number of the token or a customer number for the customer, for example, that is detected and then can be associated with data about the customer carrying the token. For instance, these data can include the customer's purchase history at the store, demographic data about the customer, or other customer data, or a combination of any two or more of them and others. Based on these customer data, a marketing offer that is targeted to the customer can be selected or created and provided for display on the customer's mobile device while the customer is in the store.

The approach to real-time, customized, direct marketing described here can enable a retailer to provide relevant marketing offers to the customer in the store that are targeted based on data about the customers. A customer can receive a personalized marketing offer, for example, an offer that can be accepted by the customer when the customer goes to the register at the store, upon arrival in a store and without having to take any particular action, thus enhancing the customer's shopping experience at the store and the customer's loyalty to the store or chain of stores. Because the marketing offer can be provided to the customer when the customer arrives in the store, the marketing offer can impact the customer's shopping choices to a greater degree than a marketing offer that is provided at check-out or when the customer is not in the store, thus helping to increase revenue for the retailer.

For example, when a customer who participates in a loyalty program of a convenience store and is carrying his loyalty card walks into the store, the card and its unique identifier are detected, e.g., within about 1 minute or about 5 minutes of the customer's arrival. The unique identifier is used to look up data associated with the customer's participation in the loyalty program. The data indicates that while the customer had bought a certain brand of shaving cream every other month for the past year, he had not bought any shaving cream in the store for three months. A customer offer for that brand is generated offering that customer 50 cents off the shaving cream if he buys it on this visit to the store.

Referring to FIG. 1, a system 10 can detect the arrival of a customer 106 in a store 102 and can provide customized marketing offers to the customer 106. A detector 100 is positioned in the store 102, e.g., at an entrance 103 to the store. The customer could be identified as having entered the store in a variety of ways. For instance, the detector 100 can include a radio frequency identification (RFID) reader 101 that is capable of detecting the presence of an RFID chip 109 and reading the unique identifier of the chip.

Referring also to FIG. 2, when a customer (e.g., customer 106) carrying a token 108 that is readable by the detector 100 arrives (200) in the store 102, the detector 100 detects (202) the presence of the token 108 which amounts, in some examples, to detecting that a customer who participates in a customer loyalty program associated with the token has entered the store 102. We use the term token broadly to include, for example, an item associated with a customer loyalty program that is carried by a customer. For instance, the token can be an item, such as a wallet loyalty card or a keychain loyalty card, that can be read (e.g., scanned) at a store register to provide discounts to the customer 106, to collect information about the customer's purchases, or both.

In some examples, the token 108 can include an RFID chip 109 that can be read by the detector 100. For instance, the RFID chip 109 can be embedded within the token 108, affixed (e.g., glued) on an outer surface of the token 108, or otherwise attached to the token 108.

The detector 100 can also read (204) a unique identifier 116 from the token 108. The identifier 116 can be, e.g., an identifier of the RFID chip 109 (e.g., a serial number of the RFID chip 109) or an identifier of the customer that is programmed into the RFID chip 109 (e.g., a loyalty number for a customer loyalty program for the store 102) or another kind of identifier that can be uniquely mapped to a particular customer who participates in the loyalty program.

We use the term customer loyalty program broadly to include, for example, any program that includes provide marketing offers, such as discounts, rebates, promotions, or other offers, to customers enrolled in the customer loyalty program, with the goal, for instance, of increasing the loyalty of and purchases by the customer at a store (e.g., an individual store or a store in a chain of stores). By discount, we mean a marketing offer that provides a discount upon purchase (e.g., a discount for $5.00 off a T-shirt, a buy-one-get-one-free discount for a box of crackers, a 10% discount off of the total purchase at a department store, a two-for-the-price-of-one offer, a five-for-the-price-of-three offer, or another type of offer). By rebate, we mean a marketing offer that returns money to the customer after purchase of a particular item (e.g., a $100 mail-in rebate after the purchase of a television). By promotion, we mean an advertisement designed to draw the customer's attention to a brand or product (e.g., an advertisement promoting a new brand of sneakers carried in the store).

In some examples, the detector 100 can include an RFID reader that can read the RFID chip 109 in the token 108 without requiring any action by or awareness of the customer 106. For instance, the detector 100 can include a long-range RFID reader, e.g., capable of reading an RFID chip up to about 40 feet away from the detector, depending on the nature of the detector 100, the RFID chip 109, and any antennae included on the detector 100. An example of a long-range RFID reader is a Motorola™ FX7400 RFID reader. In some cases, the detector may not be apparent to the customer. A detector 100 that includes a long-range RFID reader can be mounted at an entrance to the store 102, e.g., on a portal 112 over a door to the store. When the customer 106 passes through the portal (e.g., when the customer enters the store), the detector 100 detects the RFID chip 109 in the token 108 carried by the customer 106 and reads the identifier 116 from the RFID chip 109 without the customer 106 taking any action (other than walking through the portal).

In some examples, the detector 100 can include an RFID reader that reads the RFID chip 109 in the token 108 when the customer 106 deliberately interacts with the detector 100. For instance, the detector 100 can include a short-range RFID reader, e.g., capable of reading an RFID chip within about 2-4 feet away from the detector. An example of a short-range RFID reader is a Motorola™ DS9808-R hand-held RFID reader. In some examples, near-field communications can be used to read an RFID chip within about 1-3 inches from the detector. A detector 100 that includes a short-range RFID reader can be incorporated into a kiosk 114, e.g., near the entrance to the store 102. When the customer 106 swipes or taps the token 108 at the kiosk 114, the detector 100 detects the RFID chip 109 in the token 108 and reads the identifier 116 from the RFID chip 109.

In some examples, multiple detectors 100 can be positioned throughout the store 102. For instance, a detector 100 including a long-range RFID reader can be positioned at an entrance to each aisle in the store to detect the location of the customer 106 carrying the token 108 within the store. In that way, because the locations of products in aisles of the store are known, the offers may be customized based on the additional factor of the proximity of the customer to various products or types of products in the store.

The detector 100 provides (206) the identifier 116 to a marketing system 120 hosted on a computing device 121, such as a server. The computing device 121 can be in wired or wireless communication with the detector 100, e.g., through a communications network such as the Internet 150 or an intranet local to the store 102. In some examples, the computing device 121 is a computer located in the store 102. In some examples, the computing device 121 is a centralized server that hosts a marketing system 120 providing services to multiple stores 102.

An identification module 122 in the marketing system 120 retrieves (208) customer data 133 associated with the identifier 116 of the customer's token 108. For instance, the identification module 122 can access a database 124 to retrieve the customer data 133. In some examples, the database 124 can be hosted on the same computing device 121 as the marketing system 120. In some examples, the database can be hosted on a different computing device in communication with the computing device 121.

The customer data 133 associated with the identifier 116 can include a customer number 134 for the customer 106. In some examples, the customer number 134 can be a loyalty number in a customer loyalty program for the store 102. For instance, when the identifier 116 is a serial number of the RFID chip 109 in the token 108, the identification module 122 can retrieve the customer number 134 that is associated with the identifier 116. In some examples, the identifier 116 is the same as the customer number. The identifier can in any event be used to locate customer data for a particular customer who is a participant in the loyalty program.

The customer data 133 associated with the identifier 116 can include contact information 136 for the customer 106. For instance, the customer's contact information 136 can include an email address, a phone number, or another identifier for a mobile device 128, such as a mobile phone or a tablet, associated with the customer 106. The customer data 133 can also include contact preferences 138 for the customer 106, such as the mode of communication preferred by the customer (e.g., whether the customer prefers to receive marketing offers by email, by short message service (SMS) messages, directly in a marketing app 129 associated with the marketing system 120, or by another mode of communication). The contact information 136 can also include contact preferences for the customer, such as an indication of whether the customer 106 has opted out of receiving marketing offers from the particular store 102 or from all stores served by the marketing system 120. In some examples, the contact information 136 is provided by the customer 106 when registering the mobile device 128 with the marketing system 120, e.g., when the customer 106 installs the marketing app on the mobile device 128.

The identification module 122 provides some or all of the customer data 133 to a communication module 130 of the computing system 120. For instance, the identification module 122 can provide the customer number 134 and the phone number for the customer's mobile device 128 to the communication module 130. The communication module 130 causes a signal 132 to be sent (210) to the customer's mobile device 128 to prepare the mobile device 128 to be able to receive a communication, such as a marketing offer. For instance, preparing the mobile device 128 can include turning on a wireless Internet connection (which we also call a WiFi connection) of the mobile device 128, activating the marketing app 129 associated with the marketing system 120, or another type of preparation, or a combination of any two or more of them.

In some examples, the signal 132 induces automatic preparation of the mobile device 128. The signal 132 can be an email, an SMS message, a notification to be displayed on the mobile device 128, or another type of communication that instructs the mobile device 128 to turn on its WiFi connection, to activate the marketing app 129, or both. For instance, the signal 132 can include a validation signal, such as a code, that validates permissions of the mobile device 128 that allow the WiFi connection to be remotely turned on, that allow the marketing app 129 to be remotely activated, or both. In some examples, the customer 106 has previously consented to allow automatic preparation of the mobile device 128, for instance, when registering the mobile device 128 with the marketing system 120.

In some examples, the signal 132 prompts the customer 106 to take an action to prepare the mobile device 128. For instance, the signal 132 can be an email, an SMS message, a notification to be displayed on the mobile device 128, or another type of communication that prompts the customer 106 to prepare the mobile device 128. In some cases, the signal 132 can instruct the customer 106 to turn on the WiFi connection of the mobile device 128, to activate the marketing app 129, or both. In some cases, the signal 132 can ask for the customer's approval for the mobile device 128 to be automatically prepared, e.g., by remotely turning on the WiFi connection of the mobile device, by remotely activating the marketing app 129, or both.

The communication module 130 also causes the customer number 134 to be sent (212) to an analysis module 140. In some examples, the analysis module 140 is hosted by the computing system 121 that hosts the marketing system 120. In some examples, the analysis module 140 is part of an analysis system 141 hosted by another computing device, e.g., a remote server 142 connected to the computing system 121 through the Internet or an intranet local to the store 102. For instance, the server 142 hosting the analysis system 141 can be a server associated with a data analytics provider that provides analytics services for the customer loyalty program for the store 102.

In some examples, the communication module 130 can also send a confirmation signal 135 to the analysis module 140 confirming that the signal 132 to prepare the mobile device 128 has been sent.

The analysis module 140 determines (214) or in some cases generates a marketing offer 142 for the customer 106. The marketing offer 142 can include a discount, a rebate, or another type of marketing offer, or a combination of any two or more of them. In some examples, the marketing offer 142 can be customized for the particular customer 106. For instance, the analysis module 140 can access a customer database 144 that stores customer data 146 associated with the customer number 134, such as demographic data for the customer 106 (e.g., age, gender, ZIP code, income range, or other demographic data, or a combination of any two or more of them), purchase history of the customer 106 at the store 102 or at other stores or both, or other types of customer data, or a combination of any two or more of them. Based on some or all of the customer data 146 for the customer 106, the analysis module 140 determines the particular marketing offer 142 to be provided for the customer 106. For instance, the analysis module 140 can select the particular marketing offer 142 from a set of available marketing offers 149 stored in an offers database 148 or can create a new marketing offer. In some cases the marketing offer to be used is not simply selected from a set of available marketing offers, but is custom generated on-the-fly for delivery to the customer.

In one example, when a customer enters a department store, the marketing module 140 determines that the customer is a female in the age range 25-40 who purchases primarily business casual clothing. Based on this demographic data and purchase history for the customer, the marketing module 140 selects a $25 discount for a pair of shoes and a promotion for a new line of women's suits for the customer.

In one example, when a customer enters a pharmacy, the marketing module 140 determines that the customer purchases three bottles of Shine! brand shampoo approximately once a month and that the customer has not made a shampoo purchase in five weeks. Based on this purchase history for the customer, the marketing module 140 creates a buy-one-get-one-free discount for Shine! brand shampoo for the customer.

In some examples, the marketing module 140 can also determine the marketing offer based on real-time data 150. We use the term real-time data broadly to mean data reflective of a current status of something. The real-time data 150 can include real-time customer data, such as data about the current location of the customer in the store 102. For instance, if a customer enters the cereal aisle of a grocery store, the marketing module 140 may select a discount for the brand of cereal most frequently purchased by the customer. The real-time data 150 can include external data, such as data about the current weather or the current season. For instance, on a hot summer day, the marketing module may select a discount for a cold drink for every customer who enters a pharmacy.

In some examples, the marketing module 140 can also determine the marketing offer for the customer 106 based on customer data 152 for other customers, e.g., stored in the customer database 144. For instance, when a customer enters a home improvement store in the summer, the marketing module 140 determines that the customer is a male in the age range 18-25 who has never shopped at the store before. Based on the purchase history of other customers with similar demographic data, the marketing module 140 selects a $25 rebate on a charcoal grill for the customer.

The marketing module 140 provides the marketing offer 142 to the communication module 130 of the marketing system 120, which sends (216) the marketing offer 142 to the customer's mobile device 128. In some examples, a link (e.g., a URL) to a web page displaying the marketing offer 142 can be sent instead of or in addition to the marketing offer itself. In some examples, the marketing offer 142, the link, or both can be sent to the marketing app 129 for display within the app. In some examples, the marketing offer 142, the link, or both can be sent as an SMS message, an email, or both. In some examples, the customer 106 can be notified, e.g., by a sound or vibration of the mobile device 128, that the marketing offer 142 has been received by the mobile device.

The marketing offer 142 can be sent to the customer 106 while the customer is still in the store 102, thus providing real-time marketing access to the customer. The combination of this real-time access and the ability to present a customized marketing offer to the customer 106 can enhance the customer's shopping experience and can help to encourage the customer to make a purchase based on the marketing offers he receives.

In some examples, the system 10 can detect when the customer 106 leaves the store 102. For instance, a first time that the system 10 detects the customer's token 108 can be designated as an arrival, and a second time (e.g., within a certain period of time, such as a second time within 30 minutes, within 1 hour, within one day, etc.) that the system 10 detects the customer's token 108 can be designated as a departure. The system 10 can provide an arrival time and a departure time or an elapsed time to the marketing system 120. The marketing system 120 can use information such as the average amount of time a customer spends in the store 102 for various purposes, e.g., to assess the store's approach to in-store marketing.

In some examples, the customer data 146 stored in the customer database 146 can include store visit history for the customer 106. For instance, the frequency with which the customer 106 visits the store 102 can be stored. In some examples, e.g., for a loyalty program for a chain of stores, the frequency with which the customer 106 visits a particular store 102 of the chain, the frequency with which the customer 106 visits any store of the chain, or both can be stored. In some cases, the analysis module 140 can determine the marketing offer 142 for the customer 106 based on the customer's store visit history. For instance, the analysis module 140 may select or create a more generous marketing offer 142 for a customer whose visits to SuperTown grocery stores have become less frequency than for a customer who regularly visits SuperTown once a week.

In some examples, the presence of the customer 106, the location of the customer 106 in the store 102, or both can be detected by monitoring the position of the customer's mobile device 128. For instance, WiFi triangulation or Global Positioning Service (GPS) techniques such as geofencing can be used to detect when the customer's mobile device 128 enters the store 102 or to detect the location of the mobile device 128 in the store 102. In some examples, WiFi triangulation or GPS techniques can be integrated with a planogram to determine the position of the customer 106 in the store 102. In some examples, infrared beacons can be used to detect the presence or location of the customer 106 in the store 102.

In some examples, the customer loyalty program can be a brand loyalty program that is not specific to any particular store or chain of stores. In some cases, the computing device 121 that hosts the marketing system 120 can be a centralized server that is administered by the brand and in communication with local computing devices at one or more stores that participate in the brand loyalty program. In some cases, the server 142 that hosts the analysis module 140 can be a server that is administered by the brand.

Figure 3:
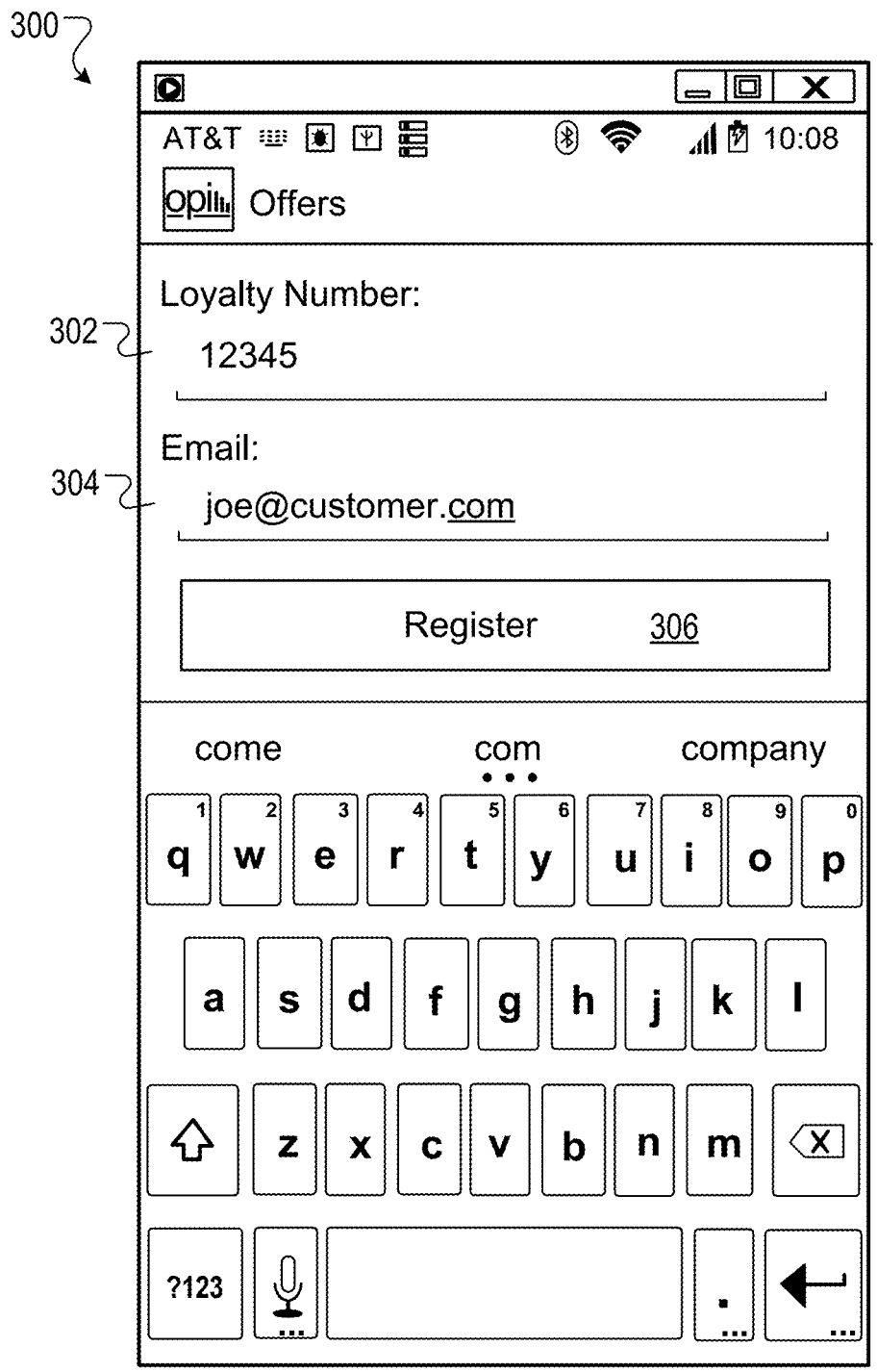

Referring to FIG. 3, when a customer installs the marketing app on his mobile device, a registration screen 300 can prompt the customer to register the mobile device with the marketing system. The marketing app can be specific to a particular store or chain of stores or can be a marketing app that is associated with multiple stores or chains.

In some examples, the registration screen 300 can prompt the customer to enter his loyalty number 302 for a customer loyalty program at one or more stores or store chains. In some examples, the registration screen 300 can prompt the customer to enter contact information, such as an email address 304, a mobile phone number, or other contact information; contact preferences; or both. In some examples, the registration screen 300 can prompt the customer to enter demographic information, such as age, gender, income range, or other demographic information. In some examples, the registration screen 300 can prompt the customer to enter shopping preferences, such as preferred brands or preferred types of products. In some examples, the registration screen 300 can allow the customer to opt out of receiving marketing offers for one or more stores.

In some examples, the registration screen 300 can allow the customer to set up the automatic preparation of the mobile phone 128 when the customer enters a store. For instance, the customer can give or refuse permission for the WiFi connection of the phone to be automatically turned on, for the marketing app to be automatically activated, or both.

Figure 4:
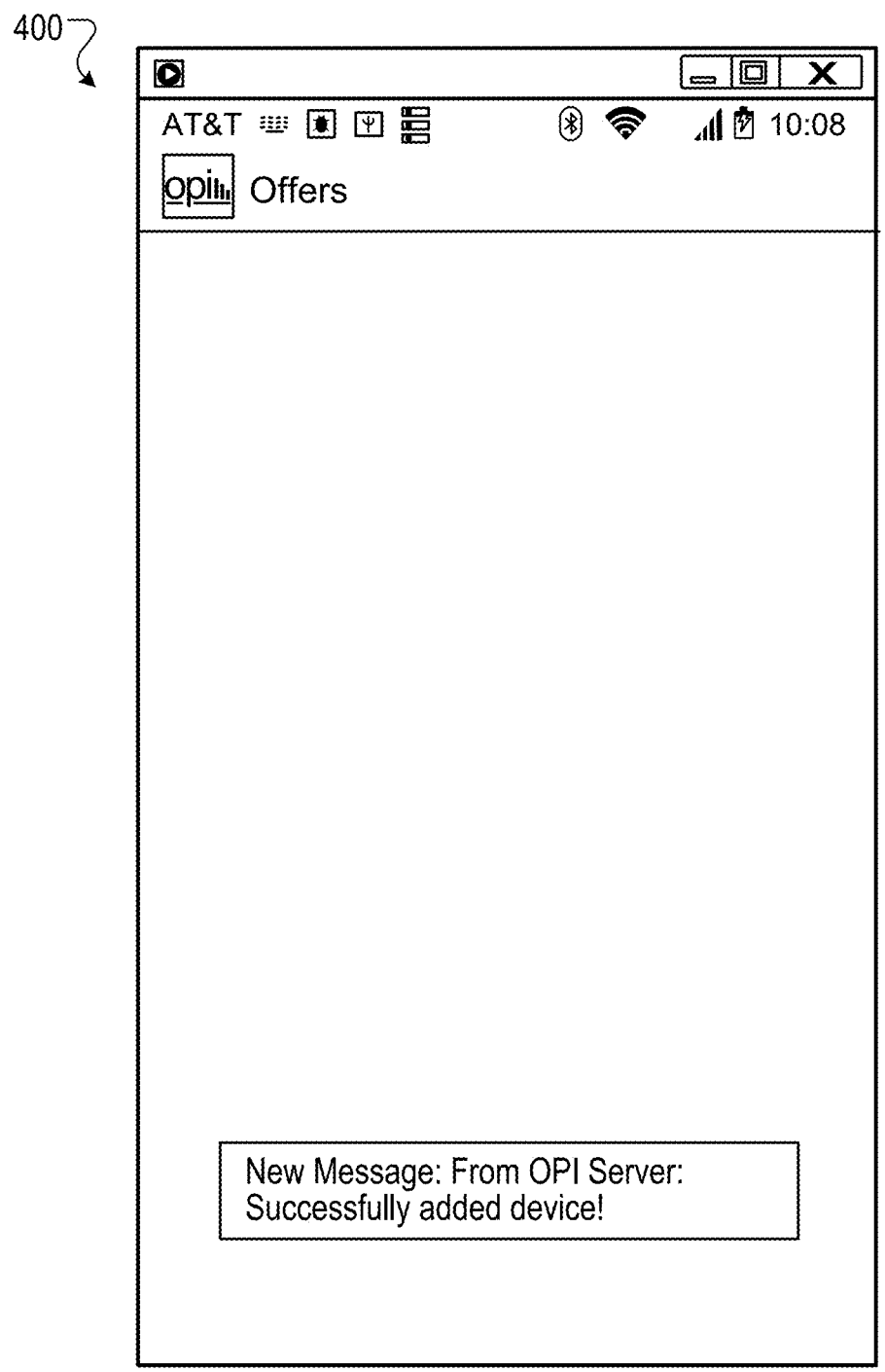

Once the customer has entered the appropriate information on the registration screen, the customer can select (e.g., by clicking or tapping with a finger or stylus) a registration button 306. Referring to FIG. 4, when the customer has successfully registered the mobile device, a confirmation screen 400 can be displayed. Upon registration, the customer's mobile device is associated with the customer identifier (e.g., the customer's loyalty number). Thus, when the customer is detected entering a store, the marketing system will be able to identify the mobile device associated with the customer so that customized, real-time marketing offers can be sent to the customer's mobile device.

Figure 5:
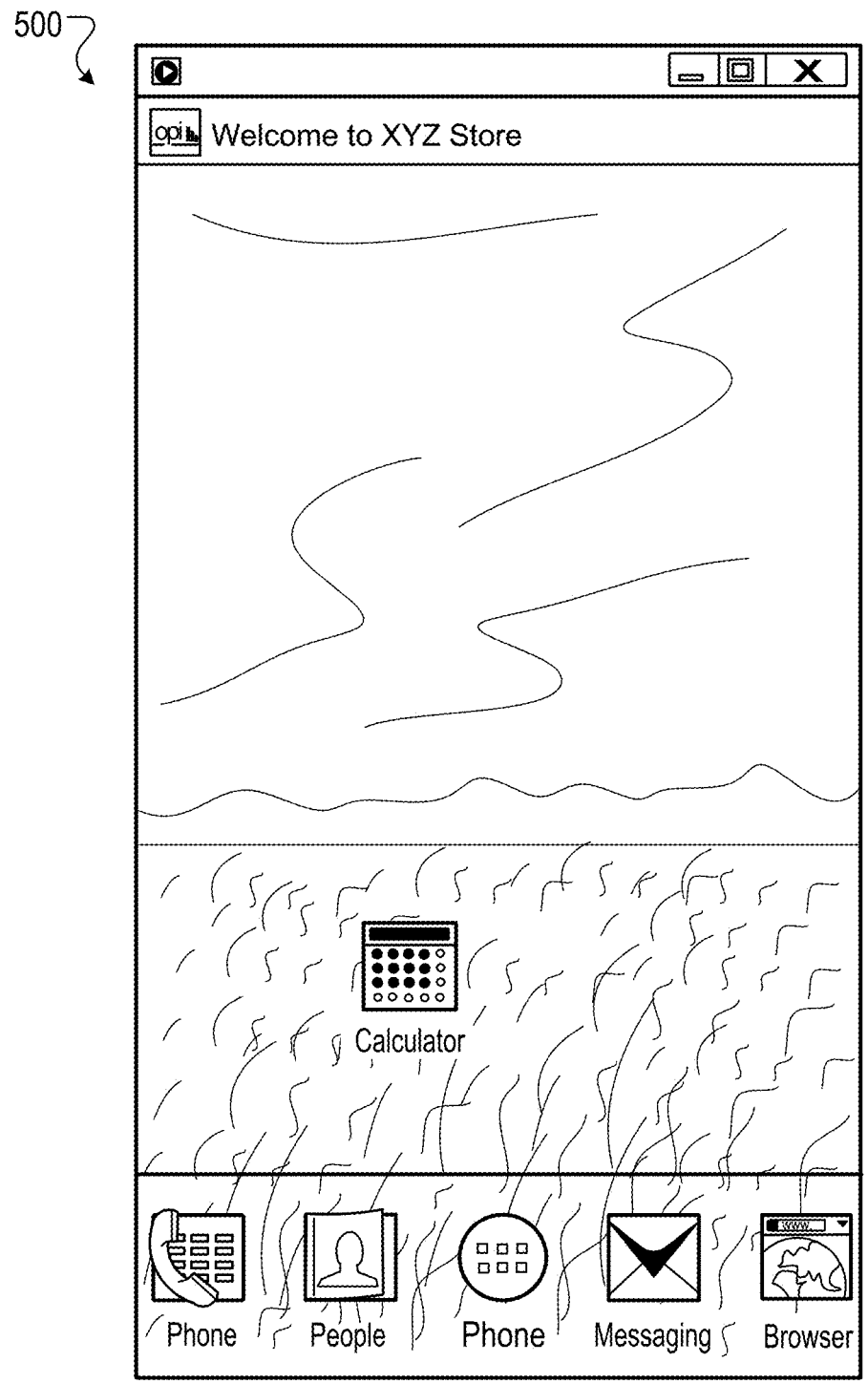

Referring to FIG. 5, when the customer is detected entering a store, a welcome message 500 is displayed. In some examples, the customer's mobile device can vibrate, make a sound, or otherwise alert the customer that the welcome message has been received. In the example of FIG. 5, the welcome message 500 is displayed as a banner message. In some examples, the welcome message 500 can be displayed as an icon or notification message.

In some examples, when the customer enters the store, the mobile device can be automatically prepared (e.g., the WiFi connection can be automatically turned on, the marketing app can be automatically activated, or both). In some examples, the customer can select the welcome message 500, e.g., by tapping on the welcome message 500 with a finger or stylus, swiping down on the welcome message, or otherwise selecting the welcome message. Selection of the welcome message 500 can cause a prompt to be displayed that asks the customer for permission to automatically prepare the mobile device or that instructs the customer to prepare the mobile device.

Figure 6:
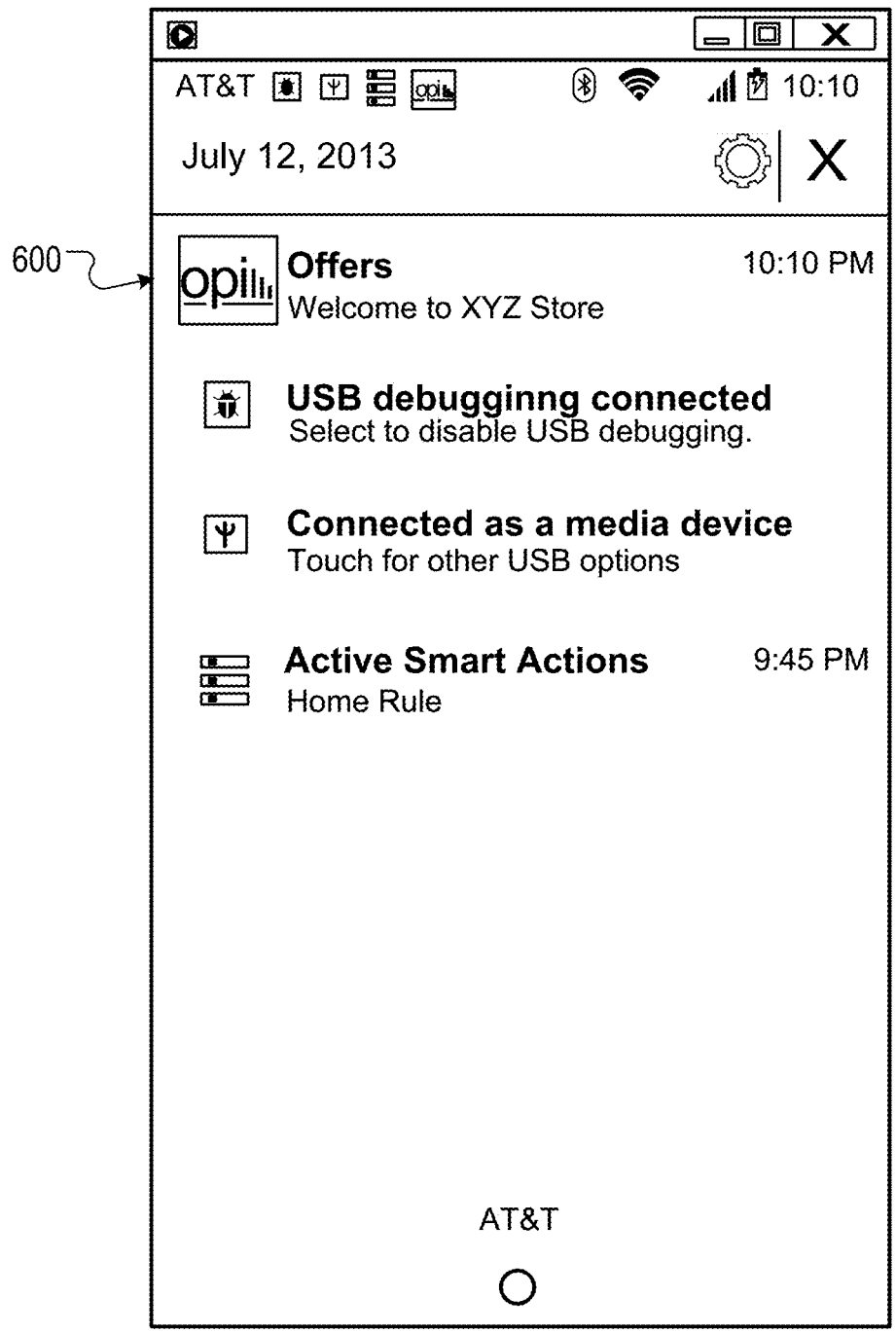

Referring to FIG. 6, in some examples, when the customer selects the welcome message, a link 600 can be displayed. The link 600 can be a link to the marketing app, a link to a web page displaying marketing offer for the customer, a link to an SMS message that includes the marketing offer for the customer, a link to an email message that includes the marketing offer for the customer, or a combination of any two or more of them.

Figure 7:
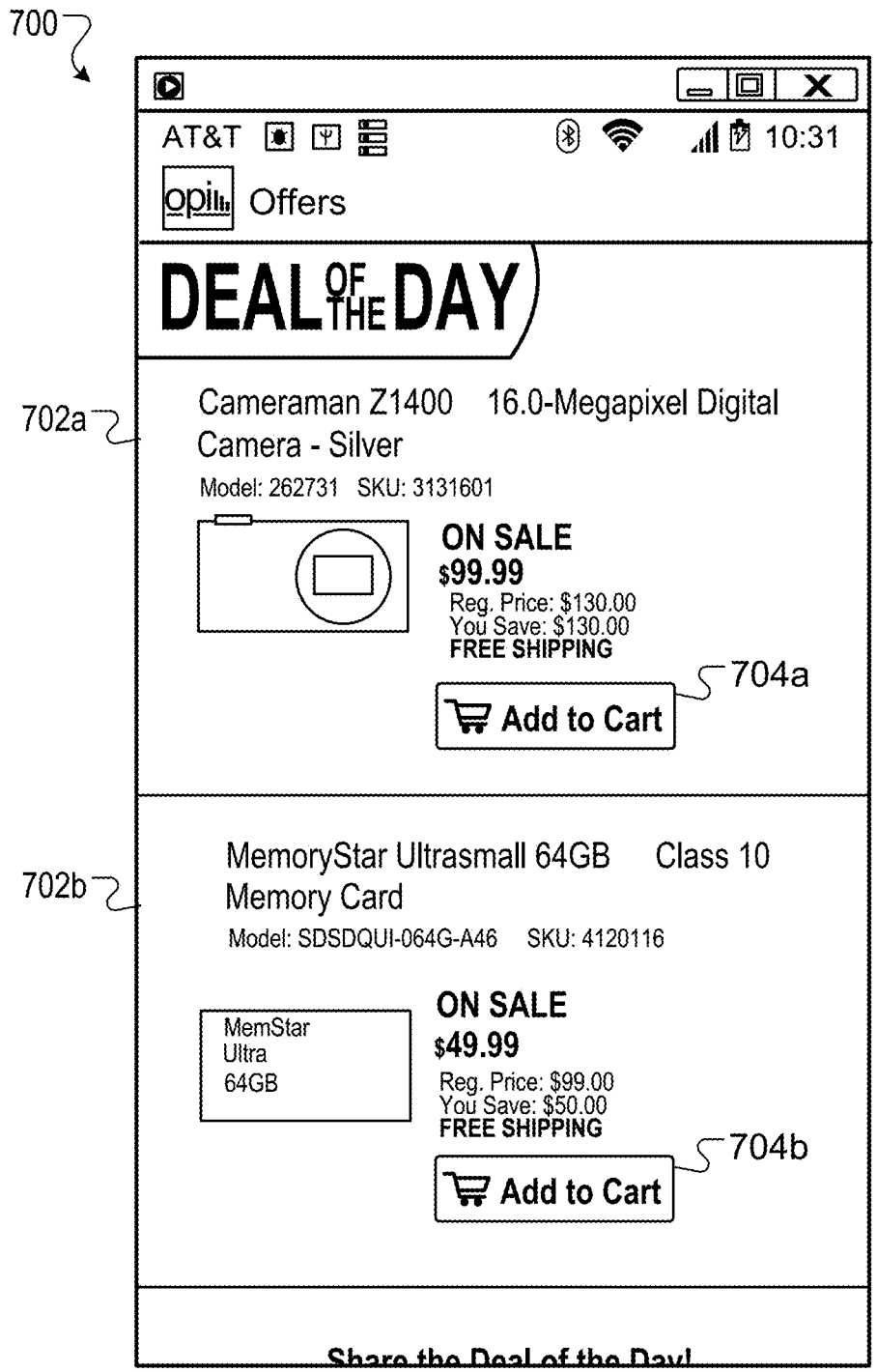

Referring to FIG. 7, in one example, when the customer selects the link 600, an offer screen 700 in the marketing app is displayed. For instance, the offer screen 700 can be a custom web page displayed within the marketing app. In this example, two marketing offers 702a, 702b are displayed in the marketing app offering discounts on the online purchase of a camera and a memory card. Each of the marketing offers 702a, 702b includes a link 704a, 704b, respectively, that the customer can select (e.g., by tapping on the link with a finger or stylus) to purchase the item.

Figure 8:
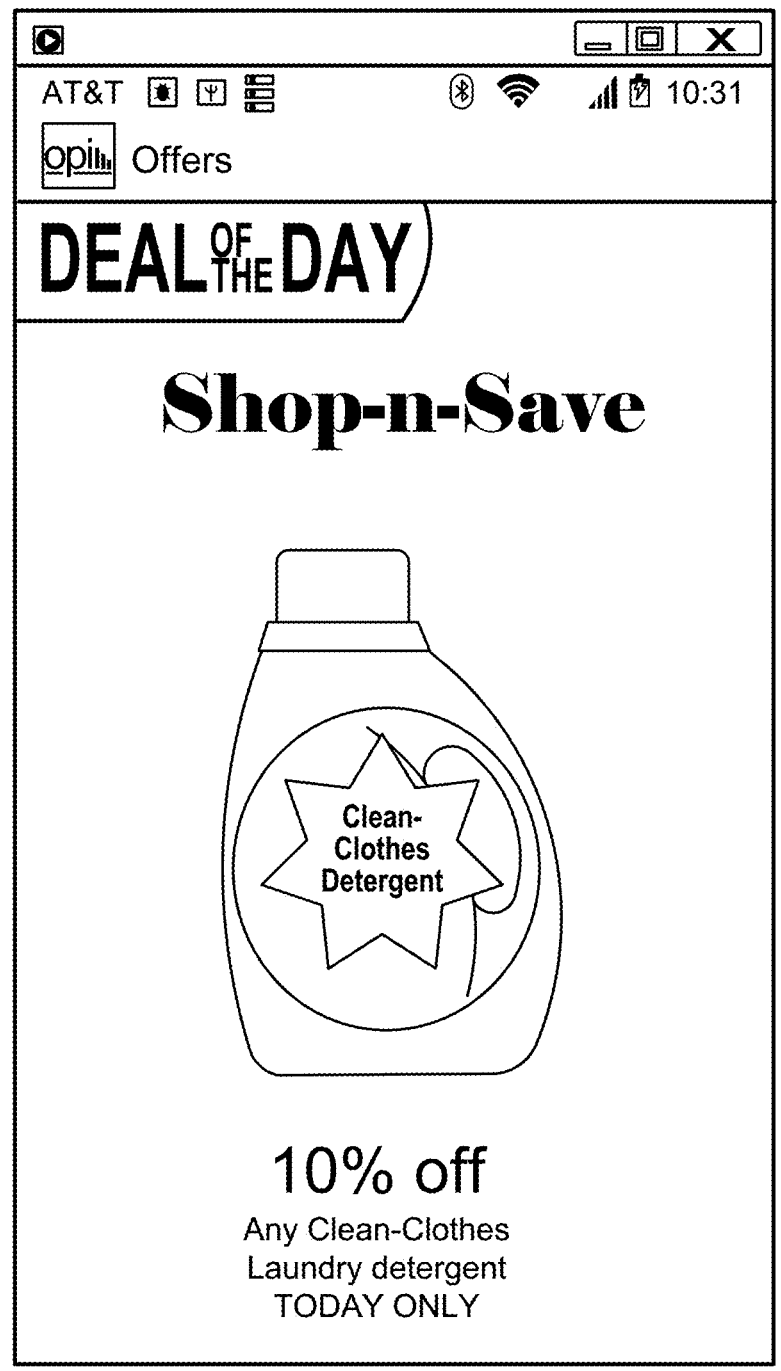
Figure 9:
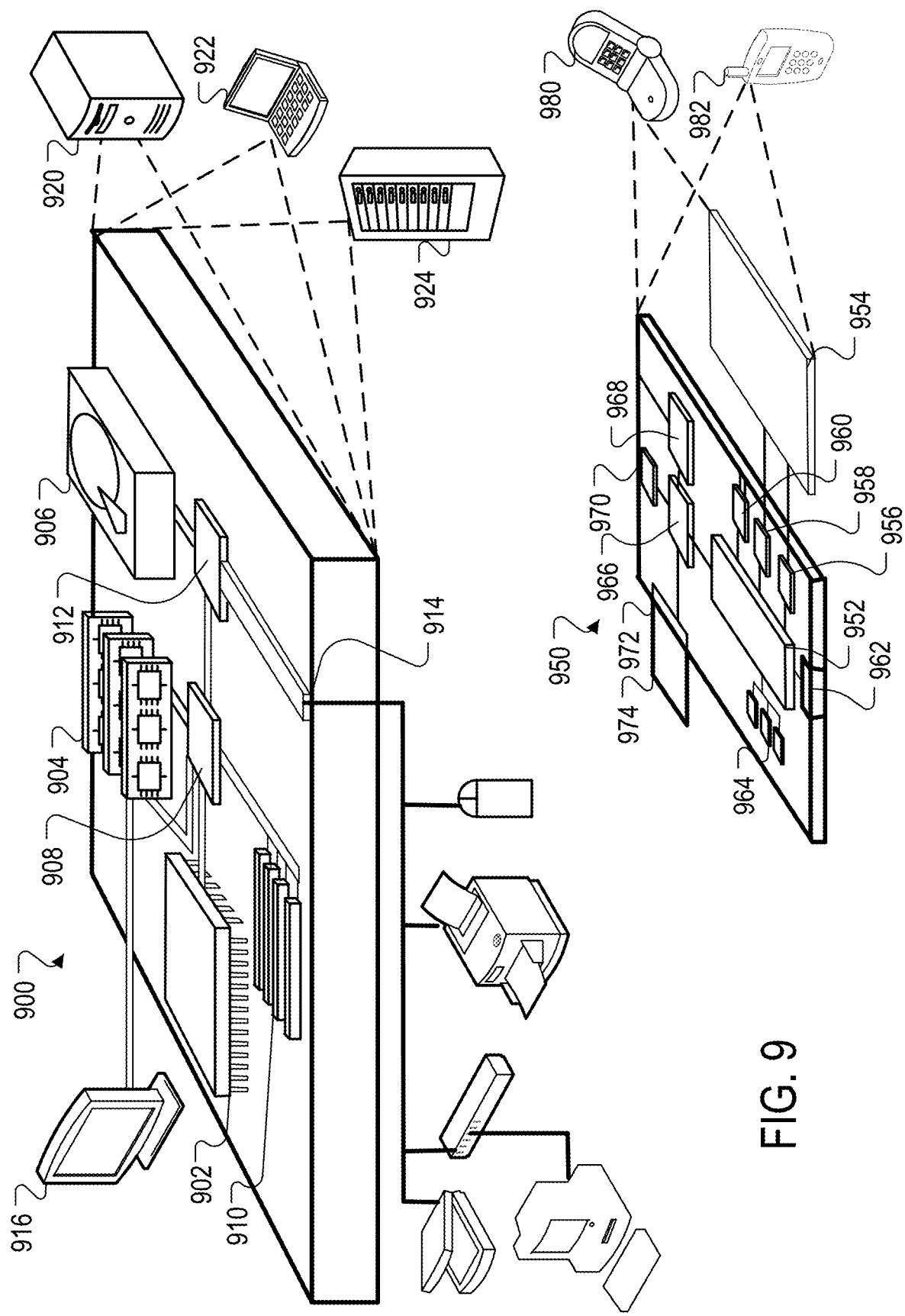

Referring to FIG. 8, in one example, when the customer selects the link 600, an offer screen 800 in the marketing app is displayed. In this example, a marketing offer is displayed that offers a discount on the purchase of a bottle of laundry detergent at the store the customer entered. The customer can show the offer screen 800 to the cashier when checking out to receive the discount.

In some examples, the approach described above can be applied to deliver marketing offers for an environment that includes multiple retailers. For instance, a mall that has several stores can employ this approach to present marketing offers to be used at any store in the mall, to be used at only a particular store in the mall, or both.

In some examples, the approach described above can be applied to push location-specific commercial information onto a person's mobile device. For instance, a traveler who is a member of a frequent flier program can register his mobile device with an airport information services program. When the traveler enters the airport, information about the traveler's flight, such as check-in information and flight status, can be pushed onto the traveler's mobile device.

In some examples, the ability to track a person's location within a building can be applied to non-commercial situations. As an example, the position of each member of a military team (e.g., a SWAT team) in a building can be tracked. For instance, the military team can deposit RFID chips throughout the building, e.g., at locations decided in advance or at locations that are then communicated to a person monitoring the team. If each member of the military team wears or carries an RFID detector, the position of each team member within the building can be monitored.

FIG. 9 shows an example of a personal computing device 900 and a mobile device 950, which may be used with the techniques described here. For example, referring to FIG. 1, the computing devices 121, 128, 142 could be examples of the personal computing device 900 or the mobile device 950, and the media repository 108 could include one or more computer devices 900. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, watches, computing glasses, and other similar computing devices. The components shown here, their connections and relationships, and their functions, are meant to be examples only, and are not meant to limit implementations of the techniques described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, and so forth) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some examples, to read an RFID chip, an RFID reader can wirelessly detect an electromagnetic signal from the RFID chip that transmits information stored electronically on the RFID chip. In some cases, the RFID chip can be powered by a battery. In some cases, the RFID chip can be powered by electromagnetic induction. For instance, the RFID reader can transmit an interrogation signal to the RFID chip, which can be used to power the RFID chip.

Other implementations are also within the scope of the following claims.

What is claimed is:

1. A method comprising:
   determining, by a computing system, that a token associated with a customer is present in a store based on an interaction between the token and a token reader present in the store;
   accessing, by the computing system, a record for the customer stored in a database, the record for the customer including (i) an identifier of the token, (ii) an identifier of a mobile device associated with the customer, and (iii) a communication preference for the customer;
   responsive to determining that the token associated with the customer is present in the store, preparing the mobile device associated with the customer to receive a communication from a computing device associated with the store, including:
      responsive to determining that the token associated with the customer is present in the store, causing a signal to be sent directly from the computing system to the mobile device via a first communications network, the signal including a code capable of validating a permission of the mobile device associated with the customer, and
      responsive to determining that the token associated with the customer is present in the store, automatically causing validation of a permission of the mobile device by the mobile device based on the code included in the signal, in which validation of the permission allows the mobile device to perform both of (i) activation of a software application of the mobile device, the software application being associated with the store and (ii) activation of a wireless Internet communications capability of the mobile device, the wireless Internet communications capability being for communication over a communications network different than the first communications network; and
   after preparing the mobile device associated with the customer to receive the communication from the computing device associated with the store, transmitting, to the computing device associated with the store, a confirmation that the signal has been sent to the mobile device associated with the customer.

2. The method of claim 1, in which determining that the token is present in the store does not require an action by or awareness of the customer.

3. The method of claim 1, in which determining that the token is present in the store includes detecting the presence of the token by radio frequency identification (RFID), global positioning service (GPS) detection, or both.

4. The method of claim 1, comprising determining the identifier of the token.

5. The method of claim 1, in which the identifier of the token-comprises an identifier associated with a loyalty program for the store.

6. The method of claim 1, comprising identifying the mobile device associated with the customer based on the identifier of the token.

7. The method of claim 1, comprising determining a location of the token in the store.

8. The method of claim 1, comprising sending or causing to be sent a marketing offer to the mobile device.

9. The method of claim 1, comprising sending, to a server, one or more of the identifier of the token, the identifier of the mobile device, and an identifier of the customer.

10. The method of claim 1, comprising receiving the marketing offer from a server.

11. The method of claim 10, wherein the server identifies the marketing offer based on one or more of the identifier of the token, the identifier of the mobile device, and an identifier of the customer.

12. The method of claim 1, in which the token comprises a loyalty card.

13. A system comprising:
a detection device for detecting that a token associated with a customer is present in a store based on an interaction between the token and the detection device;
a computing device for:
accessing a record for the customer stored in a database, the record for the customer including (i) an identifier of the token, (ii) an identifier of a mobile device associated with the customer, and (iii) a communication preference for the customer; and
a communications device for, responsive to detecting that the token associated with the customer is present in the store, preparing the mobile device associated with the customer to receive a communication from a computing device associated with the store, the preparing including:
responsive to detecting that the token associated with the customer is present in the store, causing a signal to be sent directly from the computing device to the mobile device via a first communications network, the signal including a code capable of validating a permission of the mobile device associated with the customer, and
responsive to detecting that the token associated with the customer is present in the store, automatically causing validation of a permission of the mobile device by the mobile device based on the code included in the signal, in which validation of the permission allows the mobile device to perform both of (i) activation of a software application of the mobile device, the software application being associated with the store and (ii) activation of a wireless Internet communications capability of the mobile device, the wireless Internet communications capability being for communication over a communications network different than the first communications network; and
in which the communications device is for, after preparing the mobile device associated with the customer to receive the communication from the computing device associated with the store, transmitting, to the computing device associated with the store, a confirmation that the signal has been sent to the mobile device associated with the customer.

14. The system of claim 13, in which the detection device can detect that the token is present in the store without requiring an action by or awareness of the customer.

15. The system of claim 13, in which the detection device comprises an RFID reader.

16. The system of claim 13, comprising multiple detection devices each positioned at a different location in the store.

17. The system of claim 16, comprising a processing device for determining a location of the token in the store based on information from one or more of the detection devices.

18. The system of claim 13, in which the communications device is for sending, to a server, one or more of the identifier of the token, the identifier of the mobile device, and an identifier of the customer, and for receiving the marketing offer from the server.

19. A non-transitory computer readable medium storing instructions for causing a computing system to:
determine, by the computing system, that a token associated with a customer is present in a store based on an interaction between the token and a token reader present in the store;
access, by the computing system, a record for the customer stored in a database, the record for the customer including (i) an identifier of the token, (ii) an identifier of a mobile device associated with the customer, and (iii) a communication preference for the customer;
responsive to determining that the token associated with the customer is present in the store, prepare the mobile device associated with the customer to receive a communication from a computing device associated with the store, including:
responsive to determining that the token associated with the customer is present in the store, causing a signal to be sent directly from the computing system to the mobile device via a first communications network, the signal including a code capable of validating a permission of the mobile device associated with the customer, and
responsive to determining that the token associated with the customer is present in the store, automatically causing validation of a permission of the mobile device by the mobile device based on the code included in the signal, in which validation of the permission allows the mobile device to perform both of (i) activation of a software application of the mobile device, the software application being associated with the store and (ii) activation of a wireless Internet communications capability of the mobile device, the wireless Internet communications capability being for communication over a communications network different than the first communications network; and
after preparing the mobile device associated with the customer to receive the communication from the computing device associated with the store, transmitting, to the computing device associated with the store, a confirmation that the signal has been sent to the mobile device associated with the customer.

20. A method comprising
when a customer of a retail store has entered the store, automatically determining the presence of the customer in the store by detecting a token of a loyalty program that is being carried by the customer based on an interaction between the token and a token reader present in the store,
sending an identifier of the token to a server of a computing system for use in accessing a record for the customer stored in a database, the record for the customer including (i) the identifier of the token, (ii) an identifier of a mobile device associated with the customer, and (iii) a communication preference for the customer; and
causing the mobile device to prepare to be able to receive a marketing offer that can be accepted by the customer before leaving the store, including:
when the token associated with the customer is determined to be present in the store, causing a signal to be sent directly from the computing system to the mobile device via a first communications network, the signal including a code capable of validating a permission of the mobile device, and
when the token associated with the customer is determined to be present in the store, automatically causing validation of a permission of the mobile device by the mobile device based on the code included in the signal, in which validation of the permission allows the mobile device to perform both of (i) activation of a software application of the mobile device, the software application being associated with the store and (ii) activation of a wireless Internet communications capability of the mobile device, the wireless communications capability being for communication over a communications network different than the first communications network; and
after causing the mobile device to prepare to be able to receive the marketing offer, transmitting, to a computing device associated with the store, a confirmation that the signal has been sent to the mobile device associated with the customer.

21. A method comprising
receiving, at a computer system, from a reader, an identifier of a token carried by a customer into a store, the token being associated with a loyalty program of which the customer is a participant, the identifier of the token having been detected by the reader based on an interaction between the token and the reader, and
while the customer is in the store:
(a) by the computing system, using the identifier of the token to retrieve data associated with the customer, including accessing, by the computing system, a record for the customer stored in a database, the record for the customer including (i) the identifier of the token, (ii) an identifier of a mobile device associated with the customer, and (iii) a communication preference for the customer,
(b) causing a signal to be sent directly from the computing system to the mobile device associated with the customer via a first communications network, the signal including a code capable of validating a permission of the mobile device,
(c) automatically causing validation of a permission of the mobile device by the mobile device based on the code included in the signal, in which validation of the permission allows the mobile device to perform both of (i) activation of a software application of the mobile device, the software application being associated with the store and (ii) activation of a wireless Internet communications capability of the mobile device, the wireless Internet communications capability being for communication over a communications network different than the first communications network,
(e) after preparing the mobile device associated with the customer to receive the communication from the computing device associated with the store, transmitting, to a computing device associated with the store, a confirmation that the signal has been sent to the mobile device associated with the customer,
(d) generating a custom marketing offer for the customer based on the retrieved data, and
(e) based on the identifier of the mobile device, sending the marketing offer to the prepared mobile device.

22. The method of claim 1 comprising receiving, from or on behalf of the customer, a request for registration including the identifier of the mobile device associated with the customer.

23. The method of claim 22 comprising creating the record for the customer stored in the database responsive to receiving the identifier of the mobile device.

24. The method of claim 1 in which the token is distinct from the mobile device.

\* \* \* \* \*